United States Patent
Koser et al.

(10) Patent No.: US 10,706,417 B2
(45) Date of Patent: Jul. 7, 2020

(54) SYSTEM AND METHOD FOR EXECUTION OF CUSTOMER-SPECIFIC MARKETING, DISCOUNTS, AND PROMOTIONS

(75) Inventors: Vincent R. Koser, Lafayette, IN (US); G. Mark McGregor, Pine Village, IN (US); Kent A. Wert, Lafayette, IN (US)

(73) Assignee: NCR Corporation, Atlanta, GA (US)

( * ) Notice: Subject to any disclaimer, the term of this patent is extended or adjusted under 35 U.S.C. 154(b) by 3310 days.

(21) Appl. No.: 10/631,181

(22) Filed: Jul. 31, 2003

(65) Prior Publication Data

US 2004/0064368 A1    Apr. 1, 2004

(51) Int. Cl.
| | |
|---|---|
| G06Q 20/38 | (2012.01) |
| G06Q 30/02 | (2012.01) |
| G07G 1/00 | (2006.01) |
| G06Q 20/20 | (2012.01) |

(52) U.S. Cl.
CPC .......... *G06Q 20/387* (2013.01); *G06Q 20/20* (2013.01); *G06Q 30/02* (2013.01); *G06Q 30/0267* (2013.01); *G06Q 30/0268* (2013.01); *G07G 1/00* (2013.01)

(58) Field of Classification Search
USPC .......................................................... 705/14
See application file for complete search history.

(56) References Cited

U.S. PATENT DOCUMENTS

| | | | |
|---|---|---|---|
| 5,361,871 A * | 11/1994 | Gupta et al. ............... 186/61 |
| 5,368,129 A * | 11/1994 | Von Kohorn ............... 186/52 |
| 5,448,046 A * | 9/1995 | Swartz ..................... 235/432 |
| 5,687,322 A * | 11/1997 | Deaton et al. .............. 705/14 |
| 5,832,457 A * | 11/1998 | O'Brien et al. ............ 705/14 |
| 5,918,211 A * | 6/1999 | Sloane ....................... 705/16 |
| 5,979,757 A * | 11/1999 | Tracy et al. ............... 235/383 |
| 5,984,182 A * | 11/1999 | Murrah et al. ............. 235/383 |
| 6,292,786 B1 * | 9/2001 | Deaton et al. .............. 705/14 |
| 6,321,210 B1 * | 11/2001 | O'Brien et al. ............ 705/14 |
| 6,434,530 B1 * | 8/2002 | Sloane et al. ............... 705/26 |
| 6,577,861 B2 * | 6/2003 | Ogasawara ............... 455/419 |
| 6,604,681 B1 * | 8/2003 | Burke et al. .............. 235/383 |
| 6,647,372 B1 * | 11/2003 | Brady et al. ............... 705/14 |
| 6,792,292 B1 * | 9/2004 | Chatani .................... 455/566 |
| 6,820,062 B1 * | 11/2004 | Gupta et al. ................ 705/16 |
| 6,901,373 B1 * | 5/2005 | Chasko ...................... 705/14 |
| 6,907,400 B1 * | 6/2005 | Matsko et al. ............. 705/14 |
| 6,993,498 B1 * | 1/2006 | Deaton et al. .............. 705/20 |
| 7,013,286 B1 * | 3/2006 | Aggarwal et al. .......... 705/14 |

(Continued)

*Primary Examiner* — Eric R Netzloff
*Assistant Examiner* — Rodney Henry
(74) *Attorney, Agent, or Firm* — Schwegman, Lundberg & Woessner

(57) ABSTRACT

A system and method for execution of customer-specific marketing, discounts, and promotions which alerts the customer that the customer is to receive the promotion. In one form, the system includes a point-of-sale computer at a checkout counter for processing purchase of items, a customer interface device at the checkout counter which alerts a customer to the existence of a promotion and for transferring details of the promotion to the point-of-sale computer, wherein the details of the promotion appear as bar code data to the point-of-sale computer, and a local promotional server wirelessly connected to the customer interface device for sending the details of the promotion to the customer interface display.

2 Claims, 9 Drawing Sheets

(56) References Cited

U.S. PATENT DOCUMENTS

| | | | |
|---|---|---|---|
| 7,063,263 B2* | 6/2006 | Swartz et al. | 235/472.02 |
| 7,209,733 B2* | 4/2007 | Ortiz et al. | 455/414.1 |
| 2002/0042774 A1* | 4/2002 | Ortiz | G06Q 20/06 705/39 |
| 2002/0091569 A1* | 7/2002 | Kitaura et al. | 705/14 |
| 2002/0161476 A1* | 10/2002 | Panofsky et al. | 700/231 |
| 2003/0001007 A1* | 1/2003 | Lee | A47F 9/047 235/383 |
| 2003/0132298 A1* | 7/2003 | Swartz et al. | 235/472.02 |
| 2003/0154130 A1* | 8/2003 | Woolley et al. | 705/14 |
| 2003/0220839 A1* | 11/2003 | Nguyen | 705/14 |
| 2006/0161599 A1* | 7/2006 | Rosen | 707/201 |

* cited by examiner

FIG. 3

UPC CODE 1:

8 20649 9XXYZ

X = DEPARTMENT
Y = FOOD STAMP AND TAX FLAG
    0 = NO FOOD STAMP OR TAX
    1 = FOOD STAMP
    2 = TAX 1
    3 = TAX 1 AND FOOD STAMP
    4 = TAX 2
    5 = TAX 2 AND FOOD STAMP
    6 = TAX 1 AND TAX 2
    7 = TAX 1 AND TAX 2 AND FOOD STAMP
Z = VOID FLAG
    0 = NORMAL DISCOUNT
    1 = VOIDED DISCOUNT
        (A PREVIOUS DISCOUNTED HAS BEEN AVOIDED)

UPC CODE 2:

8 20649 $$$$

$ = DOLLAR AMOUNT OF DISCOUNT

SYSTEM AND METHOD FOR EXECUTION OF CUSTOMER-SPECIFIC MARKETING, DISCOUNTS, AND PROMOTIONS

BACKGROUND OF THE INVENTION

The present invention relates to promotion delivery systems, and more specifically to a system and method for execution of customer-specific marketing, discounts, and promotions.

SUMMARY OF THE INVENTION

The present invention comprises a system and a method for execution of customer-specific marketing, discounts, and promotions at the point-of-sale ("POS") and/or the point-of-purchase ("POP").

In one form, the system includes a point-of-sale computer at a checkout counter for processing purchase of items, a customer interface device at the checkout counter which alerts a customer to the existence of a promotion and for transferring details of the promotion to the point-of-sale computer, wherein the details of the promotion appear as bar code data to the point-of-sale computer, and a local promotional server wirelessly connected to the customer interface device for sending the details of the promotion to the customer interface display.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 illustrates Universal Product Code (UPC) detail;

DETAILED DESCRIPTION

Figure 1:
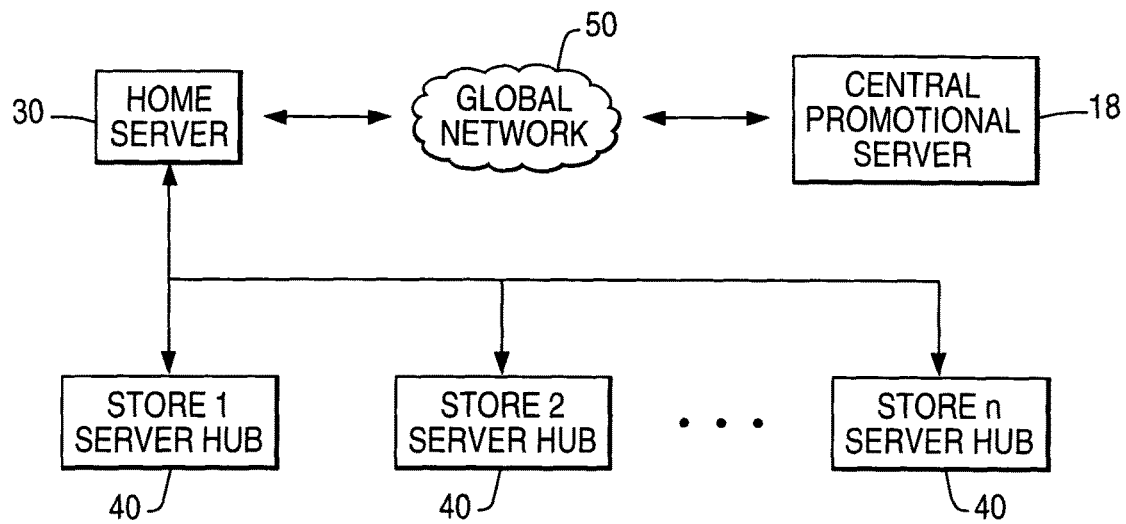
FIG. 1 is a block diagram of a promotion system.
Figure 2:
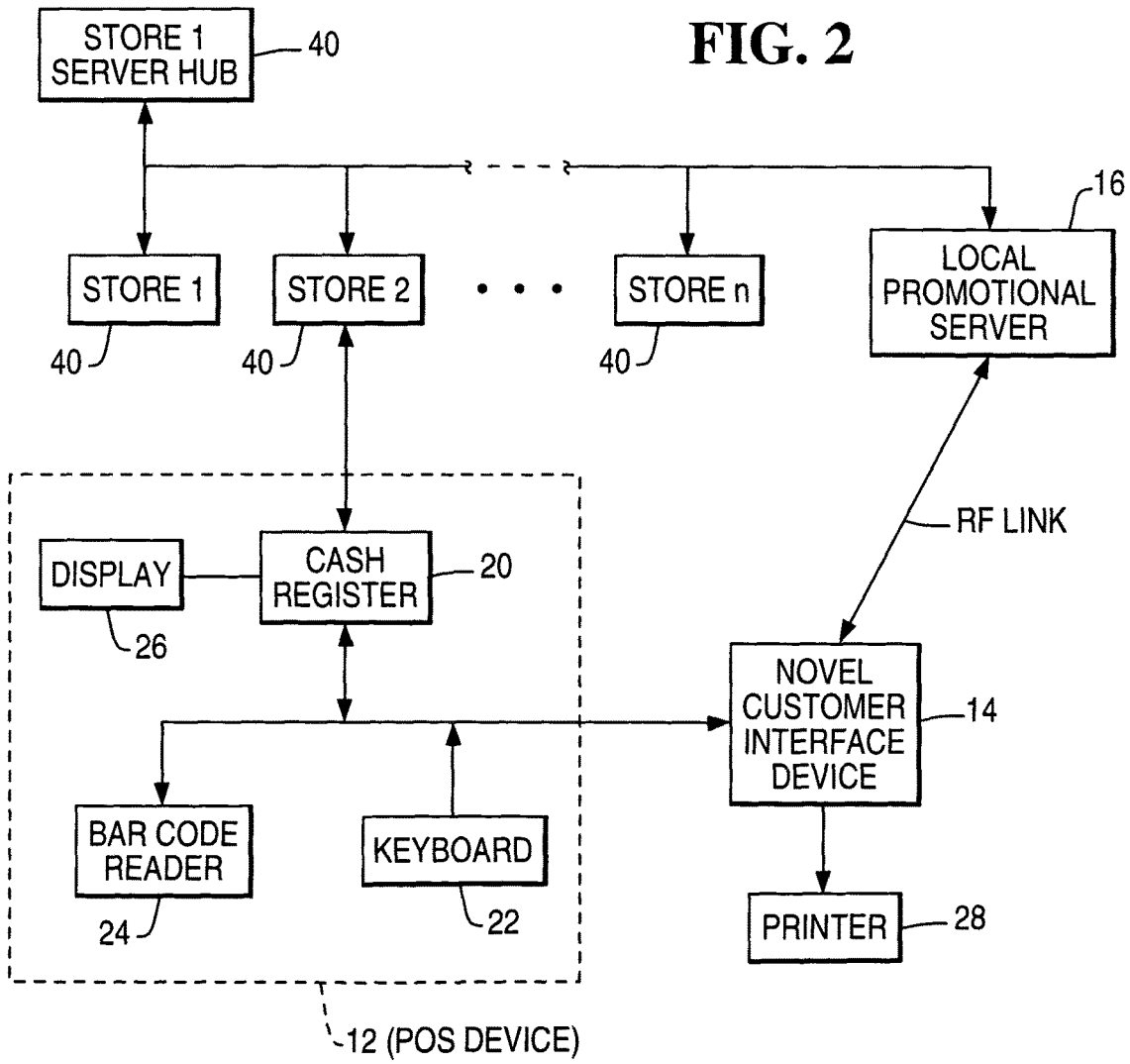
FIG. 2 is a block diagram of a transaction system including the promotion system.

With reference to FIGS. 1-2, the system of the present invention comprises a POS device 12; a customer interface device 14; one or more local promotional servers 16; and a central promotional server 18. The POS device 12 is of a type known in the art comprising a cash register 20 having a keyboard 22, a scanner 24 for electronic input to the cash register 20, one or more displays 26, and a printer 28. In one implementation, the POS device 12 is a model from the IBM® 46xx series of POS devices 12, however other models of POS devices 12 may be used such as, for example, other IBM models as well as the models sold by NCR® and other manufacturers.

The operation of the POS device 12 will be familiar to those of skill in the art. One or more products having packaging or labeling comprising a bar code, such as the well known Universal Product Code ("UPC"), are exposed to the scanner 24 in a manner causing the scanner 24 to read the bar code from the product's packaging or labeling. The POS device 12 transmits the product's UPC to a computer server, and in return receives the price and other information about the product from the computer server. If the product does not have a scannable UPC, the keyboard 22 may be used to input the requisite information.

The POS device 12 builds a transaction record containing the price and other product information for each product identified by the scanner or entered using the keyboard 22 during the purchase transaction. The price and other product information for each product also may be concurrently printed on a register tape by the printer 28 and displayed on the display 26. After the last item is scanned, the POS device 12 adds up the price of all products purchased, and executes other transaction closeout functions.

The local promotional server 16 and the central promotional server 18 of the system of the present invention are computer servers of a type known in the art. The functions of the local promotional server 16 and central promotional server 18 are discussed in more detail hereinafter. Ordinarily, the local promotional server 16 resides on the same premises as the customer interface device 14, while the central promotional server 18 is installed remotely, but this arrangement is not required. In alternate arrangements, both servers may reside on the same premises as the customer interface device 14, or both servers may be located remotely at the same or separate sites. In one implementation, the local promotional server 16 and the central promotional server 18 comprise a single server programmed and configured to carry out the functions of both servers described herein. In another embodiment, the central promotional server 18 is eliminated, and replaced with a network of local promotional servers 16 operating in a peer-to-peer arrangement. The network of local promotional servers 16 in this embodiment are programmed and configured to carry out the functions of the central promotional server 18 as described herein.

The customer interface device 14 of the present invention comprises a microprocessor, computer memory, and data input/output means. Preferably, the customer interface device 14 comprises a touchscreen display terminal, but this is not required. When used, it is preferred that the touchscreen computer display terminal be electronically configurable into one or more windows of defined pixel dimensions, wherein each window is operable to concurrently display a different graphical or textual image. Optionally, the customer interface device 14 can be adapted to comprise a scanner and/or a dedicated printer, but this is not required.

The system of the present invention also comprises software (including one or mare databases) running on the POS device 12, the customer interface device 14, the local promotional server 16, and the central promotional server 18. The software causes the system to operate in accordance with the methods described herein.

The POS device 12 and the customer interface device 14 are electronically interconnected. The electronic interconnection between the POS device 12 and the customer interface device 14 enables the customer interface device 14 to automatically acquire data about transactions occurring on the POS device 12, and enables the customer interface device 14 to provide input into the POS device 12. In one implementation of this embodiment, the interface between the customer interface device 14 and the POS device 12 is configured to make the customer interface device 14 appear to the POS device 12 to be a second scanner 24. Accordingly, in this implementation, communication from the customer interface device 14 to the POS device 12 is in the form of barcode-like data items.

The customer interface device 14 is electronically interconnected with the local promotional server 16. In one embodiment, this electronic interconnection is through a wireless radio frequency (RF) link operating in accordance with IEEE specification 802.11b, although the interconnection between the customer interface device 14 and the local promotional server 16 may occur over any means known in the art for electronic interconnection. The local promotional server 16 is electronically interconnected with the central promotional server 18 by means known in the art for electronic interconnection, such as, for example, electronic interconnection via the global network (Internet) 50. Optionally, the communication between the customer interface device 14 and the local promotional server 16 and/or the communication between the local promotional server 16 and the central promotional server 18 may be encrypted.

The system of the present invention is adapted for use in a multiple store retail chain. In this embodiment, each store 1 through n in the retail chain has a local promotional server 16. The local promotional server 16 is connected to a home server 30 at the home office of the multiple store retail chain. This interconnection may comprise a dedicated electronic interconnection. The electronic interconnection between the local promotional server 16 and the home server 30 may comprise one or more intermediate servers 40 and routers of a type known in the art. The home server 30, in turn, is electronically interconnected with the central promotional server 18 via the global network 50 in this embodiment. Thus, communication from the central promotional server 18 to the local promotional server 16 in this embodiment passes through the home server 30.

In a multiple store retail chain setting, it is common for substantially all items offered far sale in by the retail chain have a unique product identifier. The present invention may be configured to automatically provide discounts based solely on the product identifier of the product being purchased and the promotions developed that include such products.

In another embodiment of the present invention used in a multiple store retail chain, the present invention is adapted to operate in conjunction with the retail chain's customer loyalty program. The retail chain's customer loyalty program is such that each customer participating in the customer loyalty program is assigned on loyalty program identifier. The loyalty program identifier may be, for example, an alphanumeric string, a bar code, a code stored on a magnetic stripe, a biometric identifier, a radio frequency identifier ("RFID"), or another type of identifier known in the art. Substantially all items offered for sale by the retail chain also have a unique product identifier. The customer's loyalty program identifier and the product's unique identifier are essential data items in the operation of this embodiment of the present invention.

The discussion which follows describes an implementation of an embodiment of the present invention in a multiple store grocery chain. Accordingly, the well-known UPC serves as the product's bar code identifier in this implementation, it being understood that in other retail settings, other product identification protocols may be used; it being further understood that the use of other product identification protocols and the implementation of the present invention other retail settings are within the scope of the present invention.

Each store in the retail grocery chain of this implementation has a local promotional server 16. Information about at least a portion of the members of the chain's customer loyalty program is saved on the store's local promotional server 16, as is information about the items for sale in the particular store including, without limitation, the UPC far each item.

One or more POS devices 12 in a retail store in the chain are adapted to communicate with each customer interface device 14. Normally, the ratio is one POS device 12 per customer interface device 14. In operation in a retail grocery store embodiment, as the customer checks out, the customer's loyalty program identifier is obtained by the customer interface device 14. In an implementation, the customer's loyalty program identifier exists in the form of a bar code which is scanned by the scanner 24 and then automatically obtained by the customer interface device 14 from the POS device 12. Alternately, the loyalty program identifier could be entered via keystrokes on the keyboard 22, and then obtained by the customer interface device 14 from the POS device 12. The loyalty program identifier also could be obtained directly by the customer interface device 14 through the use of a scanner integrated with the customer interface device 14, thus bypassing the POS device 12. Preferably, the customer's loyalty program identifier is obtained by the customer interface device 14 prior to the scanning of the UPC of the first item to be purchased by the customer, but this is not required. The customer's loyalty program identifier may be obtained by the customer interface device 14 any time during the customer's purchase transaction.

The customer's loyalty program identifier is transmitted from the customer interface device 14 to the local promotional server 16. Software running on the local promotional server 16 is operable to recognize the customer based on the customer's loyalty program identifier. If information about the customer is stored on the local promotional server 16, the software running on the local promotional server 16 recognizes the customer based on this information. However, if the software running on the local promotional server 16 fails to recognize the customer based on the information stored locally, the software running on the local promotion server 16 is operable to promptly query the central promotional server 18 in an attempt to recognize the customer. If information about the customer is stored on the central promotional server 18, the software running on the local promotional server 16 recognizes the customer based on this information. After the customer is recognized, the software running on the local promotional server 16 identifies any promotions for which the customer is eligible. Such promotions have been prepared in advance and stored on the local promotional server 16. Further discussion of exemplary promotions and the means by which such promotions are prepared is included hereinafter. After the software running on the local promotional server 16 identifies promotions for which the customer is eligible, the local promotional server 16 waits until an event triggering a promotion is delivered to it by the customer interface device 14.

As the customer checks out of the grocery store, the UPC for each product purchased by the customer is scanned by the POS device 12 in the customary manner. After each UPC is scanned, the POS device 12 retrieves the product's price and other information about the product from the store's server (which ordinarily is not the same as the store's local promotional server 16) based on the product's UPC. The price and information for each product scanned during the transaction are stored in the memory of the POS device 12. The customer interface device 14 then automatically acquires the product's UPC and the price from the POS device 12. The product's UPC and price are transmitted to the local promotional server 16 by the customer interface device 14. Software running on the local promotional server 16 is operable, upon receipt of the UPC and price, to determine whether the particular product (as identified by the UPC) purchased by the customer (recognized by his or her loyalty program identifier) triggers a discount during the then-current transaction, based on a promotion for which the customer is eligible. If so, the local promotional server 16 transmits discount parameters to the customer interface device 14. Software running on the customer interface device 14 is operable, upon receipt of the discount parameters, to transmit a discount transaction to the POS device 12.

In one embodiment, the discount parameters communicated from the local promotional server 16 to the customer interface device 14 comprise bar code data items into which the discount parameters are encoded. The discount transaction comprises bar code data items transmitted from the customer interface device 14 to the POS device 12.

The present invention comprises special software running on the POS device 12 that is operable to interpret the bar code data items comprising the discount transaction. This software is not normally present on an off-the-shelf POS device 12. In response to its interpretation of the bar code data items, the software running on the POS device 12 simulates keystrokes that cause the discount parameters to be entered into the data of the ongoing transaction then residing in the memory of the POS device 12. Thus, promotional discounts are delivered to the customer at the time of the check out transaction. The amount owed by the customer is adjusted accordingly during the purchase transaction.

It is known in the POS device 12 art to provide a key called a "store coupon key", or a key by another name having a similar function. It is common for discount coupons to bear a scannable bar code into which the amount of the discount and other information is encoded. However, if a cashier is presented with a valid coupon that does not bear a bar code, the cashier must be able to grant the discount. By depressing the store coupon key and then manually entering a sequence of keystrokes corresponding to the coupon and its discount, the cashier is able to cause the discount to be entered into the data of the ongoing transaction residing in the memory of the POS device 12. In an embodiment of the present invention, the software running on the POS device 12 uses the store coupon key in a novel way.

FIG. 3 shows one embodiment of the bar code data items used by the present invention to encode discount parameters and transmit a discount transaction. The embodiment shown in FIG. 3 comprises bar code data items compatible with the well-known UPC.

Where the bar code data items comprise UPC compatible data items, two bar code data items are used to encode discount parameters and transmit a discount transaction. Pursuant to the UPC protocol, the first six digits of each bar code data item are the manufacturer code for Copient Technologies, LLC. The next five digits of each bar code data item comprise the discount parameters. The twelfth and final digit (not shown in FIG. 3) of each bar code data item comprises a check digit computed in accordance with the UPC protocol.

According to this embodiment, the first bar code data item always has a number nine in the first position after the manufacturer's code (i.e., the 7th position of the bar code). In the 8th through 11th positions, the first bar code data item contains information identifying the department of the grocery store against which the discount will accrue for accounting purposes, the food stamp and tax flags required by the retailer, and a flag indicating whether the transaction is a discount or is voiding a previously issued discount. For example, if the discount applies to the purchase of meat, a code identifying the meat department would appear in the 8th and 9th positions. If the discount applies to the purchase of paper goods, a different code identifying the appropriate department would appear in the 8th or 9th positions. The food stamp and tax flag code appearing in the 10th position of the bar code data item identifies, for example, whether the item is taxable or not, and if taxable, whether it is subject to one or two different taxes. It also identifies whether the item is eligible for being purchased using food stamps. The transaction flag appearing in the 11th position of the bar code data item is necessary to instruct the POS device 12 as to whether the amount of the discount appearing in the second bar code data item should be added to or subtracted from the amount owed by the customer.

According to this embodiment, the second bar code data item always has a number other than nine in the 7th position of the bar code. The second UPC code contains the amount of the discount (or voided discount), encoded into the 7th through 11th positions, wherein the dollar component of the discount appears in the 7th through 9th positions, and the cents component of the discount appears in the 10th and 11th positions. Thus, the maximum dollar amount that can be discounted is $899.99.

In operation of this embodiment, when the local promotional server 16 determines that the customer is owed a discount, the local promotional server 16 prepares two bar code data items formatted according to the formula shown in FIG. 3 and described herein. The two bar code data items are transmitted from the local promotional server 16 to the customer interface device 14, and then transmitted to the POS device 12 from the customer interface device 14. The software running on the POS device 12 parses each item of bar code data, including the UPCs of the products being scanned during the purchase. When the software running on the POS device 12 recognizes the specific manufacturer code for Copient Technologies from the first six digits of the bar code data item, the software running on the POS device 12 is operable to recognize that a discount transaction is to be performed. If the software running on the POS device 12 identifies the number nine in the 7th position of the bar code data item, the software running on the POS device 12 causes the POS device 12 to execute key strokes implementing the discount parameters encoded into the 7th through 11th positions of the bar code data item. If the software running on the POS device 12 identifies a number other than nine in the 7th position of the bar code data item, the software running on the POS device 12 is operable to implement the discount encoded in the 7th through 11th positions of the bar code data item. Note that if the value in the $11^{th}$ position of the first bar code data item is a zero, the amount encoded in the 7th through 11th positions of the bar code data item will be subtracted from the amount owed by the customer. If the value in the 11th position of the first bar code data item is a one, the amount of the discount encoded in the 7th through 11th positions of the second bar code data item will be added to the amount owed by the customer. The discount (or voided discount) also is printed on the register tape by the printer 28.

The present invention is operable to execute promotions wherein a customer receives a discount or loyalty reward immediately upon the identification of a product by its UPC, or based upon the combination of a product identified by its UPC and other products identified by their UPCs. The Operation of a product for which a discount is immediately available is straightforward, i.e., the local promotional server 16 observes the purchase of the product, and calculates the discount in absolute or percentage terms. The discount and other discount parameters then are encoded into the bar code data item(s), and transmitted to the customer interface device 14 which, in turn, transmits the discount transaction to the POS device 12.

If the software running on the local promotional server 16 determines that the product is not eligible far an immediate discount, the software running on the local promotional server 16 checks to see if the product can be combined with other previously purchased products to determine if the customer is due far another discount or a loyalty reward. For example, if the retail store is running a promotion in which a member of the customer loyalty program purchasing five store-branded items in a single transaction is to receive a certain percentage discount on each item, this UPC is examined to determine whether it identifies a store-branded item and, if so, a record of the product is accumulated with other items on the local promotional server 16 for this particular discount promotion. When a reward has been earned, such as, for example, when the fifth store-branded item is purchased in the transaction, the local promotional server 16 causes the customer interface device 14 to transmit an appropriate discount transaction to the POS device 12.

Other exemplary promotions which the system of the present invention may be adapted to handle include promotions wherein a certain discount (dollar amount or percentage) accrues upon the customer's retail purchases during the transaction exceeding a predetermined dollar value (such as $5.00 off a retail purchase of $50.00 or more). Also, the system of the present invention can be adapted to create a promotional discount if the customer exercises certain desirable habits. For example, the promotion may specify that the customer is to receive $50.00 off his next bill if he purchases $ 100.00 or more of products in three of the four preceding weeks. When the customer achieves his third purchase exceeding $ 100.00 in the four week measurement period, the local promotional server 16 causes the customer interface device 14 to transmit an appropriate discount transaction to the POS device 12.

The system also may be adapted to classify members of the customer loyalty program into groups far purposes of targeted promotions. For example, after the customer's unique identifier is acquired by the customer interface device 14, if the information stored on the local promotional server 16 indicates that the customer is a regular purchaser of, for example, baby formula and diapers, the customer may be invited to join the retail chain's new baby group. The invitation is displayed on the display terminal of the customer interface device 14. The customer may accept the invitation to join the group by touching the appropriate area on the display terminal. Upon acceptance of the invitation, the customer's membership in the group is recorded by the local promotional server 16. Thereafter, upon acquisition of the customer's unique identifier, the customer may be eligible to receive promotional discounts directed toward his group, such as discounts on baby-related products.

The customer interface device 14 also is operable to display advertisements to customers while they purchase items. In one embodiment, advertisements are in the farm of JPEG files uploaded to the customer interface device 14 from the local promotional server 16. Preferably, the advertisements rotate based on a time-duration or other criteria. Preferably, the display terminal is divided into windows enabling the simultaneous display of mare than one advertisement. If the customer interface device 14 has a touch screen, the customer may be able to immediately obtain certain discounts based on the displayed advertisement by touching the touch screen. In an alternate implementation in which the customer interface device 14 is adapted to comprise a printer 28, coupons and advertisements may be printed by the system of the present invention.

The customer interface device 14 also is operable to display targeted advertisements to the customer. For example, if the customer is identified by the system to be a member of a group, such as the aforementioned baby group, after the customer's unique identifier is obtained by die customer interface device 14, advertisements targeted toward the group (such as baby-related products) may be displayed.

The system of the present invention also may be adapted to comprise a sweepstakes registration process. The customer interface device 14 can comprise a window containing an invitation to participate in the sweepstakes. After the customer's unique identifier has been obtained by the customer interface device 14, if the customer selects die sweepstakes invitation, such as by touching the touchscreen, the customer entry will be transmitted to the local promotional server 16.

The system of the present invention also comprises an Internet based means for 15 developing a promotion. According to this Internet based means for developing a promotion, an authorized individual may access the central promotional server 18 and define the promotion. The promotion is defined according to a set of parameters. For example, a promotion may last for only a specified duration; a promotion may apply only to a certain group of products or a certain quantity of products connected by a desirable trait (such as a store-branded product); or a promotion may be directed toward only a group of customers (such as customers in the baby-related group). In a retail store chain implementation of the present invention, a promotion may apply only to certain stores in the chain. The promotion parameters may include limits on the promotion, such as one discount per customer or one discount per transaction. The parameters of a particular promotion are left to the discretion of the practitioner of the present invention and may be adapted far each particular implementation of the present invention.

Although the present invention has been discussed herein in terms of a grocery Store implementation, the present invention is adaptable for use in any retail setting, such as a department store, a shoe store, a sporting goods store, and the like.

Likewise, although the present invention has been discussed herein in terms of placement of a customer interface device 14 at a retail store checkout, the present invention is adaptable for use in multiple settings within a single retail store location. For example, in a grocery store implementation, a customer interface device 14 may be located in the bakery department, the meat department, the floral department, the pharmacy, and so forth. Each customer interface device 14 may be programmed to display different marketing messages depending on the setting in which it is placed.

Thus, a customer interface device 14 installed in the meat department will display messages appropriate to meat department customers, a customer interface device 14 installed in the floral department will display messages appropriate to floral department customers, and so forth.

FIGS. 4-9 provide further information on the operation of the present invention.

Figure 4A:
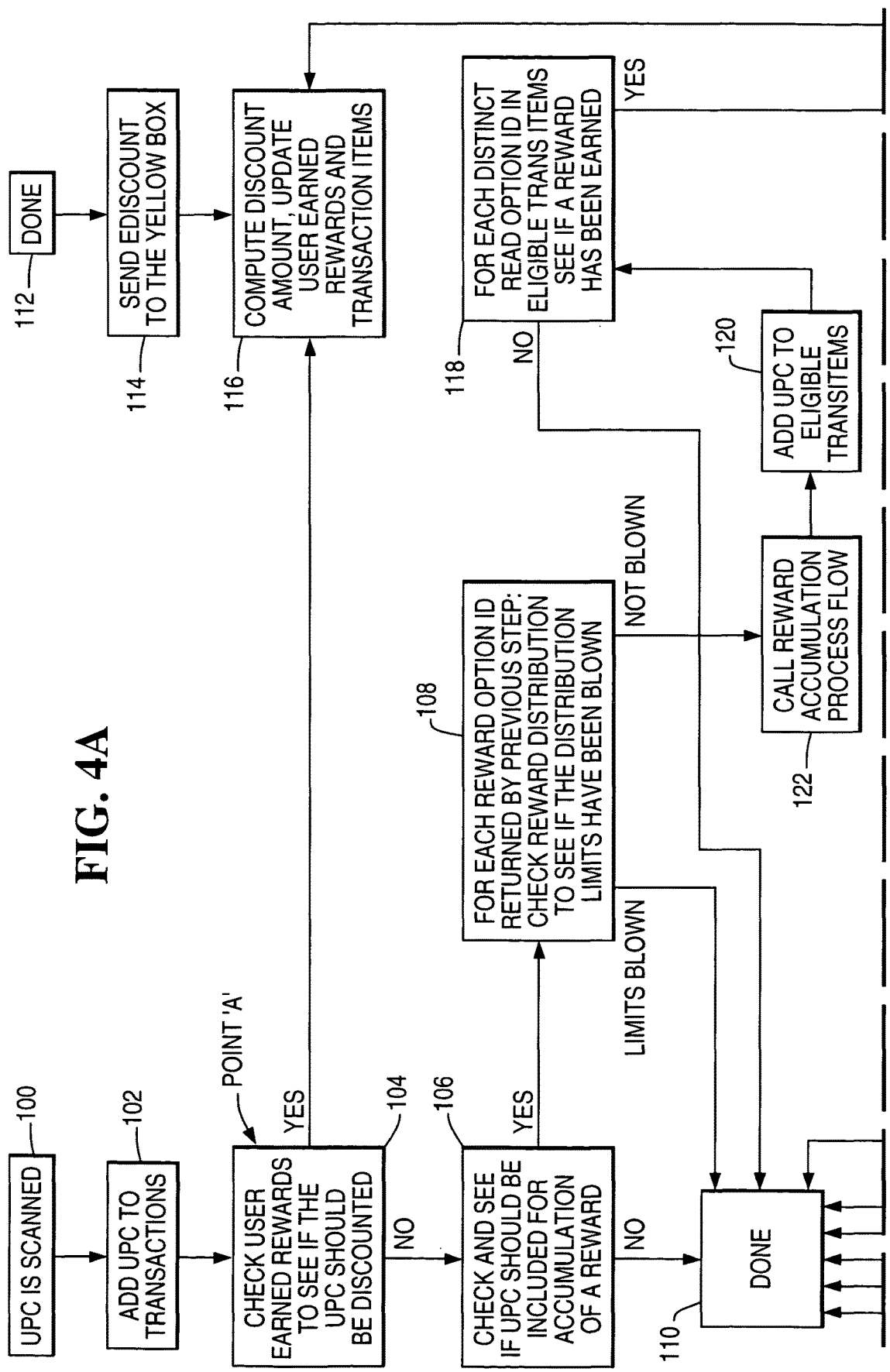
FIGS. 4A and 4B form a flow diagram illustrating a promotion method based upon scanned product bar codes.
Figure 4B:
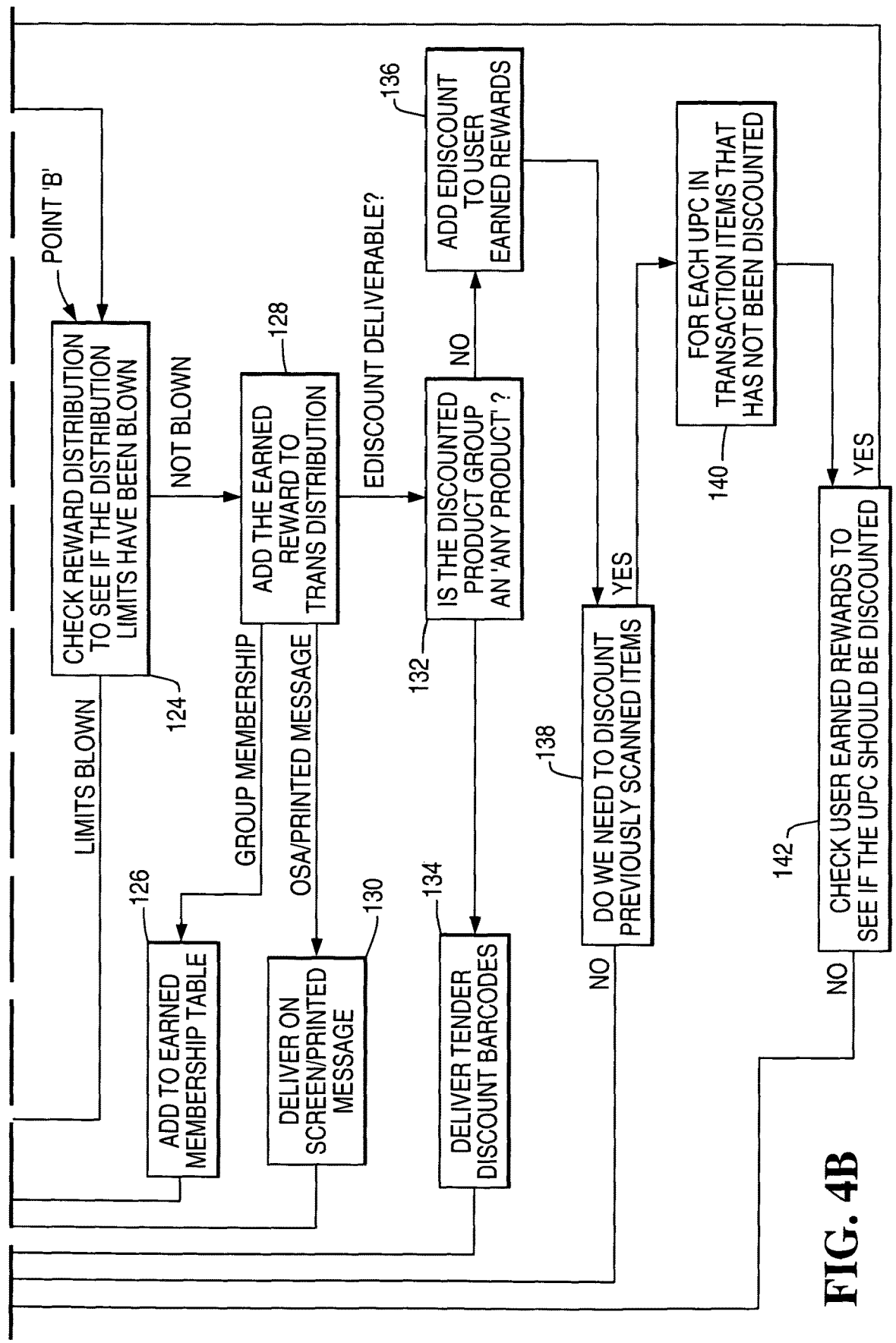

With reference to FIGS. 4A and 4B, steps 100-142 illustrate a promotion method based upon scanning of a product bar code.

Figure 5:
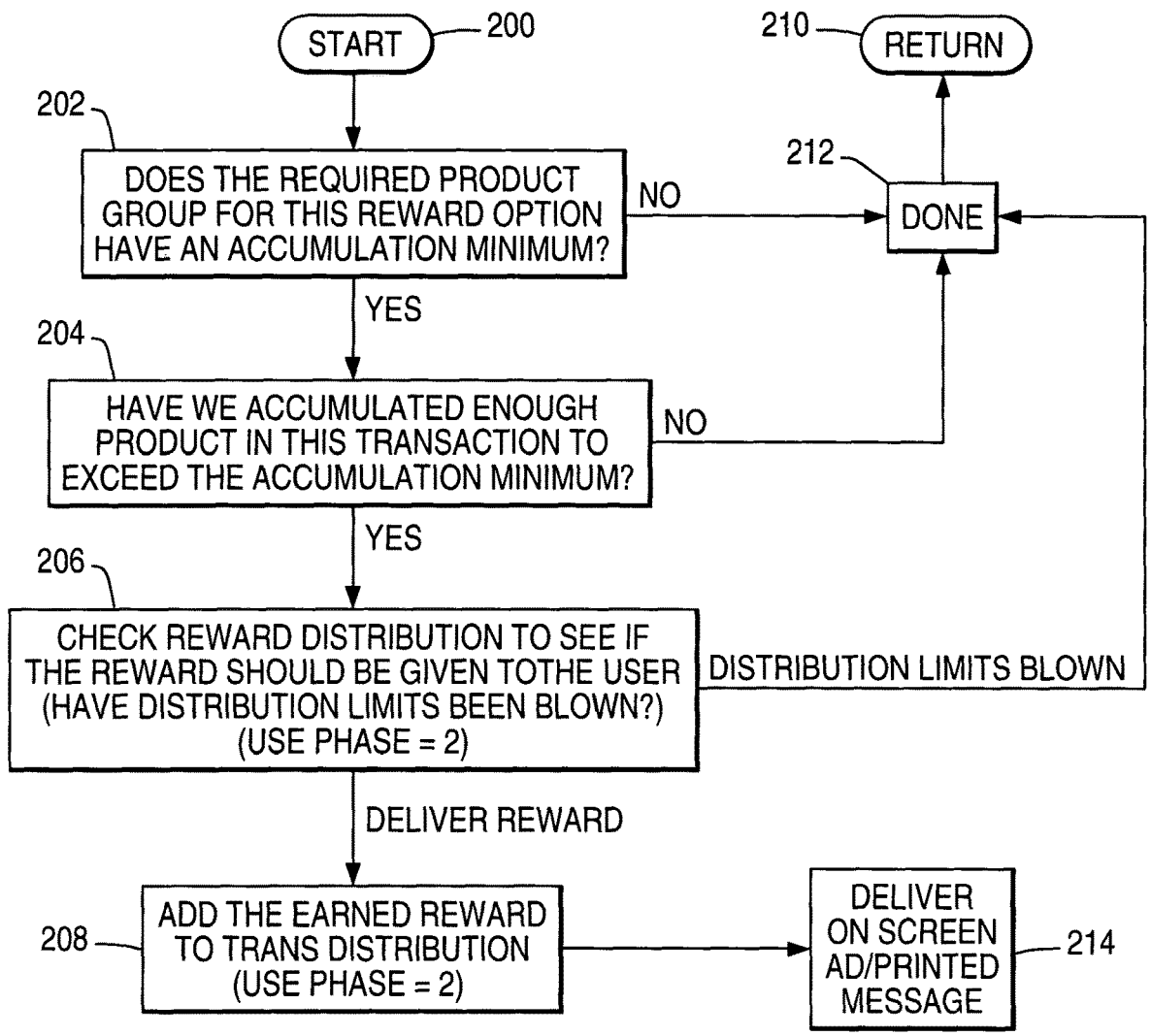
FIG. 5 is a flow diagram illustrating a reward accumulation process flow.
Figure 7:
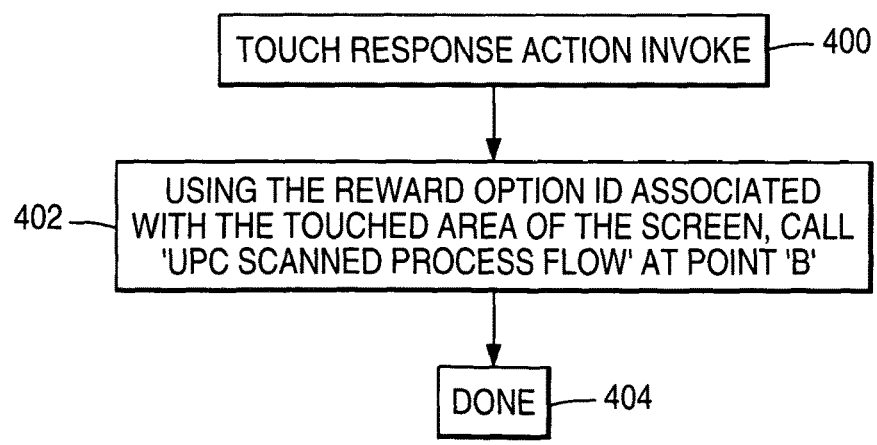
FIG. 7 is a flow diagram illustrating a screen touched process flow.
Figure 6:
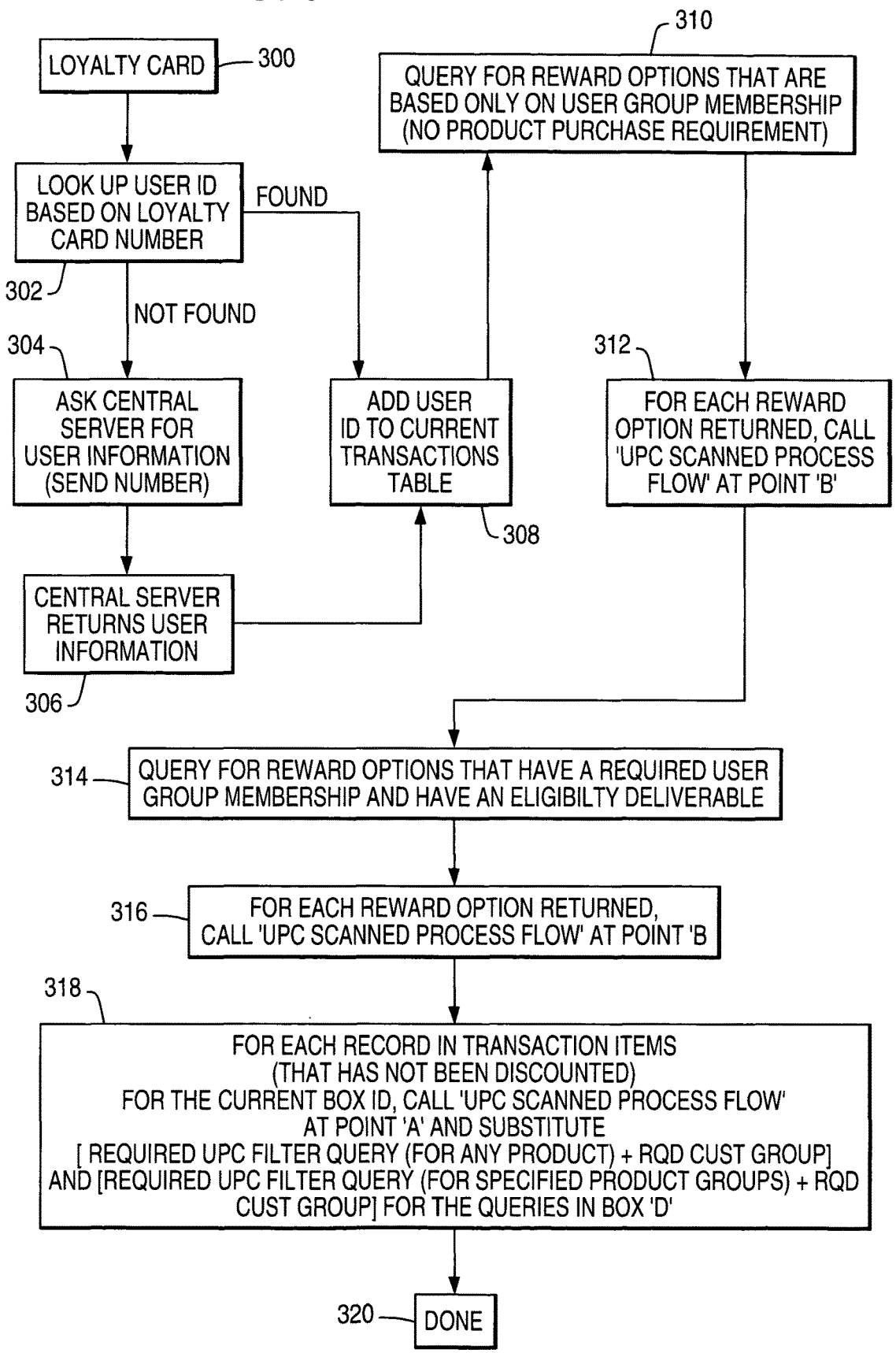
FIG. 6 is a flow diagram illustrating a loyalty card scanned process flow.

With reference to FIG. 5, steps 200-214 illustrate a reward accumulation process flow;

With reference to FIG. 6, steps 300-320 illustrate illustrating a loyalty card scanned process flow;

With reference to FIG. 7, steps 400-404 illustrate a screen touched process flow.

Figure 8A:
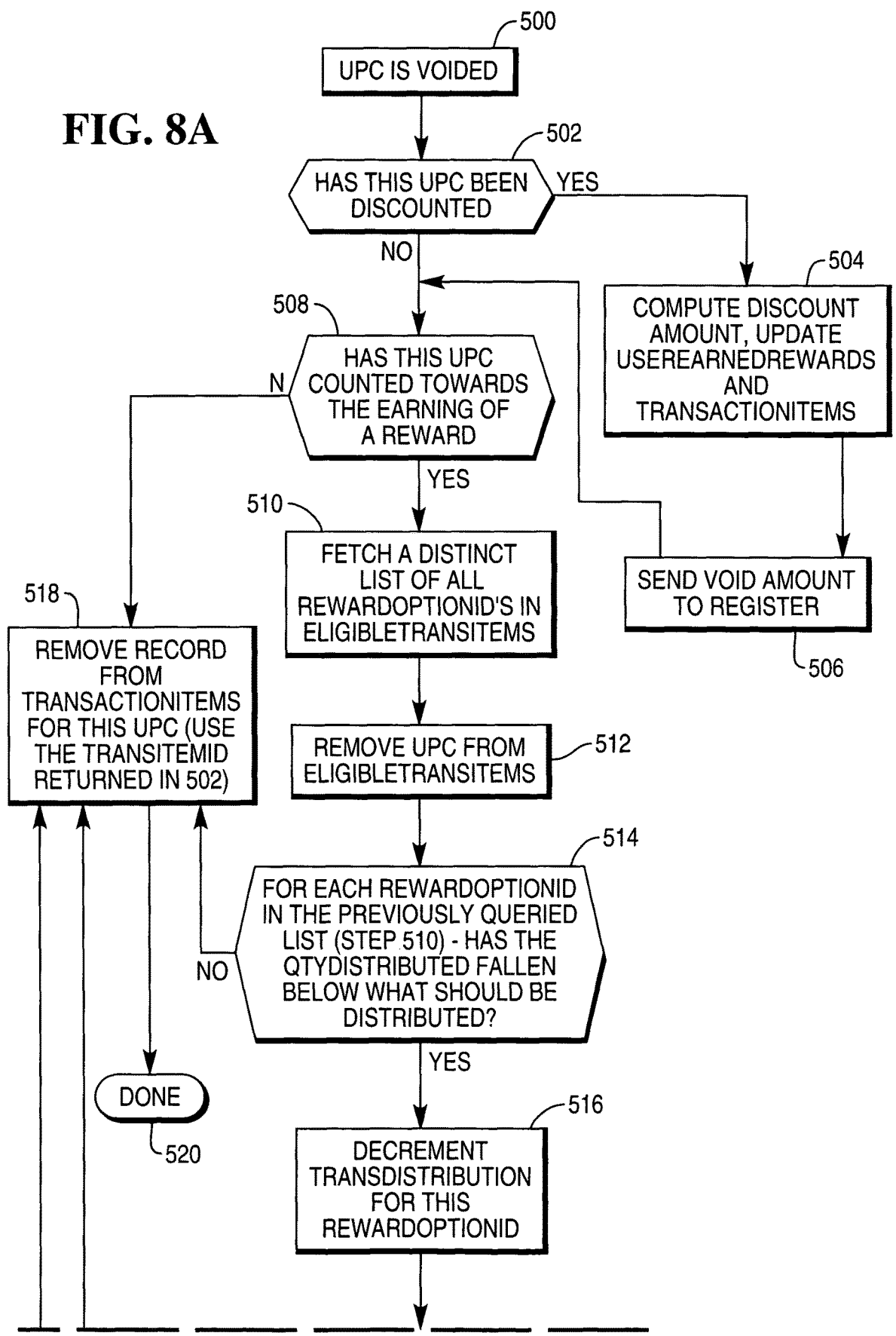
FIGS. 8A and 8B form a flow diagram illustrating a voided bar code process flow.
Figure 8B:
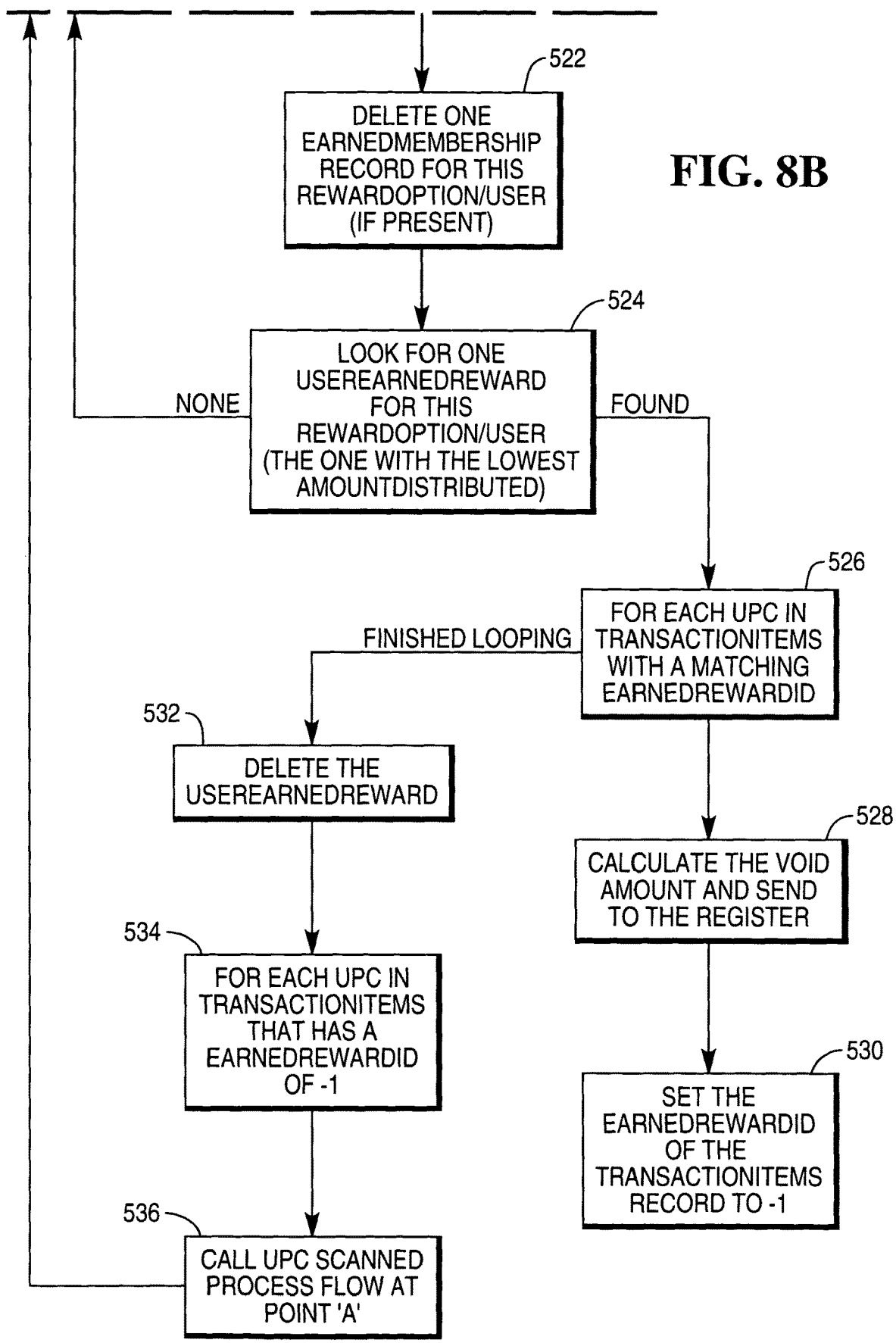

With reference to FIG. 8, steps 500-534 illustrate a voided product bar code process flow.

Figure 9:
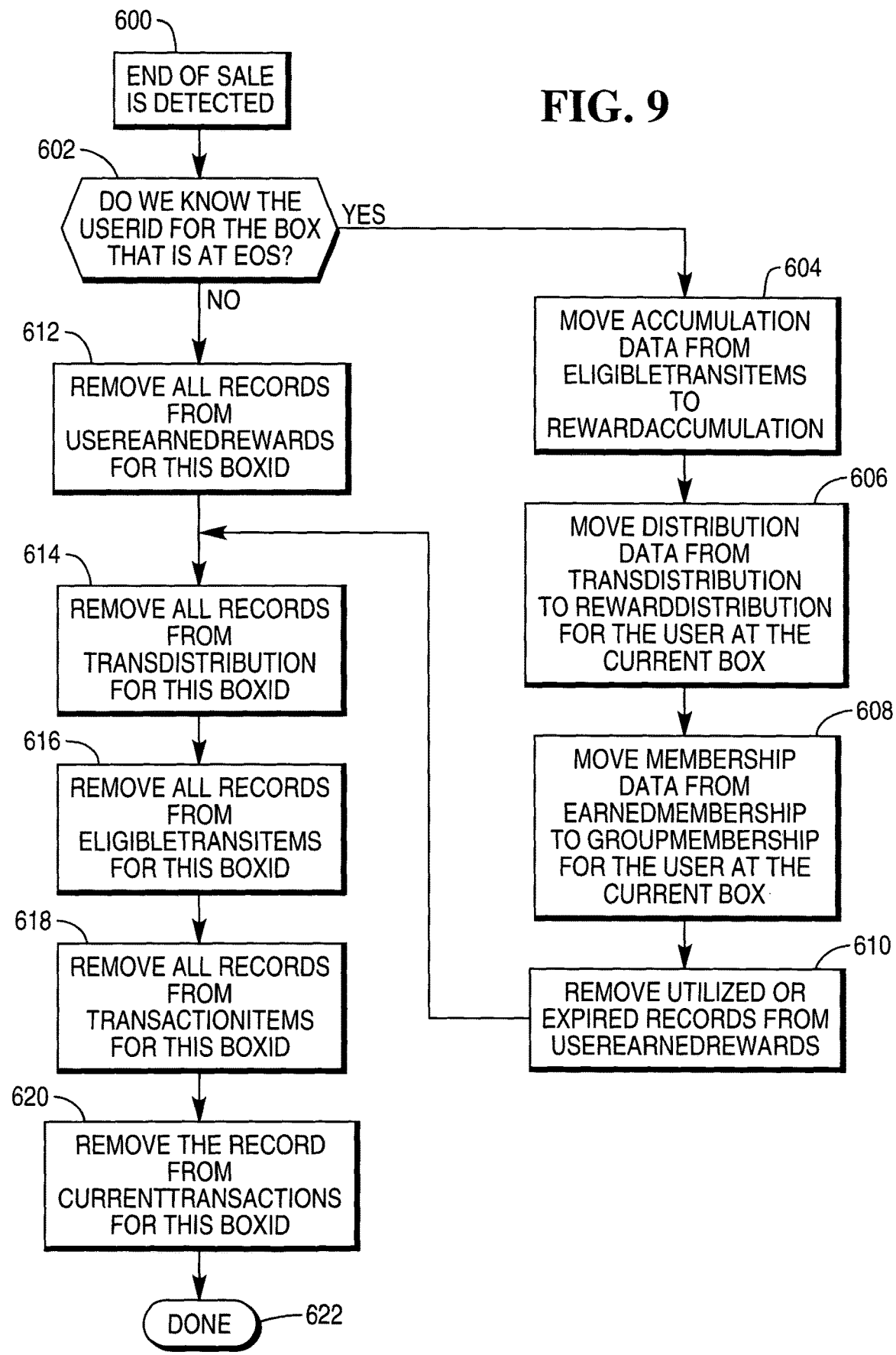
FIG. 9 is a flow diagram illustrating an end of sale process flow.

With reference to FIG. 9, steps 600-620 illustrate an end of sale process flow.

While this invention has been described as having a preferred design, the present invention can be further modified within the scope and spirit of this disclosure. This application is therefore intended to cover any variations, uses, or adaptations of the invention using its general principles. For example, the methods disclosed herein and in the appended claims represent one possible sequence of performing the steps thereof. A practitioner of the present invention may determine in a particular implementation of the present invention that multiple steps of one or more of the disclosed methods may be combinable, or that a different sequence of steps may be employed to accomplish the same results. Each such implementation falls within the scope of the present invention as disclosed herein and in the appended claims. Furthermore, this application is intended to cover such departures from the present disclosure as come within known or customary practice in the art to which this invention pertains and which fall within the limits of the appended claims.

What is claimed is:

1. A system for executing promotions comprising:

a point-of-sale computer at a checkout counter for processing a purchase of items presented to the checkout counter for scanning and identification by the point-of-sale computer;

a customer interface device at the checkout counter and in communication with the point-of-sale computer and a local promotional server for the customer interface device to alert a customer to the existence of a promotion for an item scanned at the checkout counter by the point-of-sale computer and to transfer details of the promotion to the point-of-sale computer from the customer interface device;

wherein the details of the promotion appear as barcode data to the point-of-sale computer as delivered by the customer interface device over an interface between the customer interface device and the point-of-sale computer;

wherein the interface is configured to interact with the point-of-sale computer as a scanner attached to the point-of-sale computer, wherein the scanner is the customer interface device and is different from an existing scanner interfaced to of the point-of-sale computer;

wherein the customer interface device is configured to receive the details of the local promotional server as barcode data during a transaction between the point-of-sale computer and the customer interface device;

wherein the interface is configured to provide a barcode, representing the barcode data, to the point-of-sale computer as a communication that originated from the scanner during a checkout at the checkout counter after items are processed by the point-of-sale computer for the transaction;

wherein the interface is configured to receive data for transaction information during the transaction from the point-of-sale computer as the second scanner to the point-of-sale computer;

wherein communications between the customer interface device and the point-of-sale computer are configured to occur over a connection between the interface and the existing scanner; and the local promotional server is wirelessly connected to the customer interface device for sending the details of the promotion to the customer interface device, wherein a connection between the customer interface device and the local promotional server is encrypted, wherein the customer interface device configured at any time during the transaction to scan a loyalty barcode of a loyalty card for the customer and send the loyalty barcode to the local promotional server, the local promotional server configured to provide the details of the promotion based on a loyalty identifier for the customer obtained from the loyalty barcode that identifies the customer and based on the items processed during the transaction;

wherein point-of-sale computer is configured to process the barcode for the promotion by identifying two separate barcodes included within the barcode, a first one of the two separate barcodes identifying a department that is to accrue the promotion and the second of the two separate barcodes identifying the promotion and a dollar amount for a discount associated with the promotion.

2. The system as recited in claim 1, further comprising:

a central promotional server for sending the details of the promotion to the local promotional server, wherein the local promotional server and the central promotional server are connected by a global network.

* * * * *